Patented July 17, 1951

2,560,531

UNITED STATES PATENT OFFICE 2,560,531

HEMIMERCAPTALS

Frank Kipnis, Morris Plains, and John Ornfelt, Morristown, N. J., assignors, by mesne assignments, to American Home Foods, Inc., New York, N. Y., a corporation of New Jersey No Drawing. Application August 22, 1947, Serial No. 770,178

8 Claims. (Cl. 260—332.3)

This invention relates to certain hemimercaptals having useful aromas and odors, and to a method of producing them. More particularly it relates to hemimercaptals resulting from the condensation of a molecule of a substituted glyoxal with a molecule of a mercaptan free of solubilizing groups and their immediate derivatives.

Many reactions of carbonyl compounds with mercaptans have been reported in the chemical and patent literature. For example, Schubert (J. Biol. Chem., 111 (1935), 671) reported on the interaction of methyl and phenyl glyoxal with thiol acids such as thioglycolic acid, and their derivatives and with thiourea. The reactions, carried out in aqueous or alcoholic media, yielded compounds of importance in biochemical theory but not of value for their aromatic or olent properties; addition products and condensation products were formed, among the latter being a substituted thiazolidine carboxylic acid from cysteine. Martin et al. (U.S. Patent 2,223,693, December 3, 1940) describe the reaction of aldehyde- or keto-sulfonic acids with mercaptans to form "water-soluble thioacetalsulphonic acids." They state that while "a number of not sulphonated thioacetals have been obtained by reaction of mercaptans on ketones and aldehydes in presence of acid condensing agents," the reaction "takes place plainly or smoothly with simple monoaldehydes and monoketones only." Schirm (U. S. Patent 2,369,612, February 13, 1945) discloses broadly the possibility of condensing carbonyl compounds with mercaptans to produce mercaptals or mercaptols; specifically he describes the reaction of paraformaldehyde with cetylmercaptan to give formaldehydedicetylmercaptal; monochloroacetal with n-octylmercaptan to give chloroacetaldehydedioctylmercaptal; glucose with dodecylmercaptan to give glucosedodecylmercaptal; and levulinic acid with octadecylmercaptan to give di-octadecylmercaptovalerianic acid. All these reactions were catalyzed by hydrogen chloride.

As will be obvious from an inspection of the structural formulas:

R—CO—CO—R' and H—S—R'' there are numerous possibilities in the reaction of a mercaptan with a polycarbonyl compound. The most probable are the formation of mercaptals and mercaptols (I), and hemimercaptals and hemimercaptols (II):

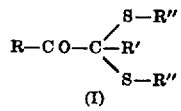

and

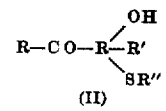

but numerous by-reactions, as well as reaction of the mercaptan with a second carbonyl group, are not excluded. Such condensations have in general been carried out in the presence of an acid catalyst—e. g. hydrogen chloride—and the course is ordinarily not simple. As pointed out by Martin et al. (quoted above) the reaction was expected to go smoothly only in the case of monoaldehydes and monoketones, in the presence of acid condensing agents.

Contrary to this expectation we have discovered that with a selected group of reactants hemimercaptals are formed in high yield without the use of any condensing agents and without the necessity of using an extraneous reaction medium such as water, alcohol or other solvent; the reaction proceeds smoothly with the formation of a negligible amount of mercaptals or other by-products, and such by-products as are formed are readily separable from the hemimercaptals. We have further discovered that the hemimercaptals thus produced have marked odors and aromas, many of them being similar to those of food products or of non-food plant materials; accordingly, in addition to constituting a new series of starting materials for organic syntheses, they should be of value in various industrial fields, for example as ingredients in scents for soaps and the like, in animal baits and in flavoring materials.

One of the objects of our invention is to provide certain hemimercaptals having desirable aromatic and olent properties.

Another object of our invention is to provide certain hemimercaptals which will serve as new starting materials for organic chemical syntheses.

A further object of our invention is to provide a method of synthesis of certain hemimercaptals which is economical and efficient and does not require the use of a condensing agent.

Additional objects and advantages of our invention will be apparent to those skilled in the art from the following description.

According to our invention we cause a substituted glyoxal having the formula R·CO·CO·H to react with a mercaptan having the formula H·S·R', R being an alkyl, carbocyclic or heterocyclic radical, and R' being an alkyl, carbocyclic or heterocyclic radical containing no solubilizing group; R and R' may be the same or different. By "solubilizing group" we mean such groups as —CO₂H, —SO₃H, —NH₂, which render the compounds in which they are found soluble in water or in aqueous acids or alkalies.

In carrying out the reaction we mix molar equivalents of the selected glyoxal and mercaptan and stir the mixture. No condensing agent is added and the use of a reaction medium such as a solvent is unnecessary and preferably avoided. In most cases the condensation reaction begins spontaneously with the development of considerable heat; as the reaction proceeds the temperature rises to a maximum and then gradually falls as the reaction is completed. On standing at room temperature the reaction mixture solidifies to a crystalline mass of crude hemimercaptal which may be purified by recrystallization from a suitable solvent, e. g. a hydrocarbon fraction. In some cases it may be desirable to initiate the reaction by gentle heating and in some cases external cooling at the height of the reaction may be desirable, but in most cases no preheating or temperature control is needed. The reaction may be represented as follows:

$$R-\overset{O}{\underset{}{C}}-\overset{O}{\underset{}{C}}-H + H\cdot S\cdot R' \longrightarrow R-\overset{O}{\underset{}{C}}-\overset{OH}{\underset{SR'}{C}}-H$$

Examples of the substituted glyoxals that may be thus reacted are:

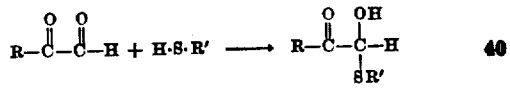

Phenylglyoxal

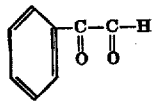

p-Ethoxyphenylglyoxal

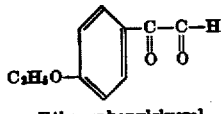

Thiophene-2-glyoxal

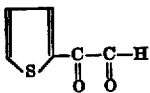

Furyl-2-glyoxal

Among the mercaptans which may be used are:

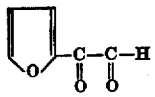

Methyl mercaptan

Ethyl mercaptan

n-Propyl mercaptan

i-Propyl mercaptan

H·S·C₆H₁₃ n-Hexyl mercaptan

H·S·C₇H₁₅ n-Heptyl mercaptan

H·S·C₁₂H₂₅ n-Dodecyl mercaptan

H·S·C₁₆H₃₃ n-Hexadecyl mercaptan

H·S·C₁₈H₃₇ n-Octadecyl mercaptan

H·S·CH₂·C₆H₅

Benzyl mercaptan

H·S·C₆H₅

Phenyl mercaptan

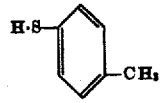

p-Cresyl mercaptan

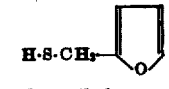

Furyl-2-methyl mercaptan

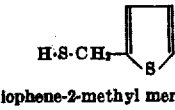

Thiophene-2-methyl mercaptan

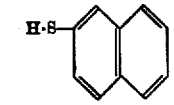

Naphthyl-2 mercaptan

The hemimercaptals of our invention are substantially colorless crystalline solids. In solid form they are stable up to their melting points, but on heating in solution, even in a non-polar solvent, they appear to dissociate since the solutions acquire a fairly strong yellow color indicative of the presence of a glyoxal; on cooling the heated solution the color disappears and the hemimercaptal may be recovered from the solution.

The following examples are illustrative and not to be taken as limiting our invention, the scope of which is defined in the appended claims.

EXAMPLE I

*Thiophene-2-glyoxal-n-propyl hemimercaptal*

Fourteen grams (0.1 mole) thiophene-2-glyoxal was mixed with 7.6 g. (0.1 mole) n-propyl mercaptan in an Erlenmeyer flask. A considerable amount of heat was generated, the temperature rising to a maximum of about 60° C. in a few minutes. During the reaction the mixture was occasionally stirred. After about twenty minutes from the initial mixing the temperature had fallen to 20° C. After the mixture had been allowed to stand for thirty minutes without stirring, it solidified to a crystal mass which was freed of mother liquor and dissolved in hot hexane, from which it crystallized on cooling. The yield was 18.8 g. or 87 percent of the theory. The product consisted of white crystals which melted with decomposition at 69° C. A combustion analysis gave the following results: Calculated for C13H20O2S2: C—49.97%; H—5.59%; S—29.64%. Found: C—50.53%; H—6.01%; S—29.72%. The compound had an onion odor.

The following list gives data on compounds embodying this invention and made according to the method of this invention.

| Name | Formula | M. P., °C. | Odor |
|---|---|---|---|
| Phenylglyoxal-ethyl hemimercaptal | C10H12O2S | 78–80 | cooked cabbage. |
| Phenylglyoxal-n-propyl hemimercaptal | C11H14O2S | 84 | scallions. |
| Phenylglyoxal-i-propyl hemimercaptal | C11H14O2S | 47–8 | cooked garlic. |
| Phenylglyoxal-n-heptyl hemimercaptal | C15H22O2S | 81 | crushed herbs, weak onion. |
| Phenylglyoxal-n-dodecyl hemimercaptal | C20H32O2S | 80–1 | mild coconut. |
| Phenylglyoxal-n-hexadecyl hemimercaptal | C24H40O2S | 88 | indefinite, musty. |
| Phenylglyoxal-n-octadecyl hemimercaptal | C26H44O2S | 90.5–91 | very slight. |
| Phenylglyoxal-benzyl hemimercaptal | C15H14O2S | 72–4 | aromatic sulfur. |
| Phenylglyoxal-phenyl hemimercaptal | C14H12O2S | 97–8 | cooked meat. |
| Phenylglyoxal-β-naphthyl hemimercaptal | C18H14O2S | 115–6 | slight aromatic; bland. |
| Phenylglyoxal-furyl-2-methyl hemimercaptal | C13H12O3S | 40 | coffee (in low concentration). |
| Phenylglyoxal-p-methylphenyl hemimercaptal | C15H14O2S | 44–5 | cooked meat. |
| Thiophene-2-glyoxal-n-heptyl hemimercaptal | C13H20O2S2 | 76–7 | hay; flowery; marigold. |
| Thiophene-2-glyoxal-methyl hemimercaptal | C7H8O2S2 | 91–3 | cooked cabbage. |
| Thiophene-2-glyoxal-ethyl hemimercaptal | C8H10O2S2 | 58–9 | leeks; mild fried onions. |
| Thiophene-2-glyoxal-n-propyl hemimercaptal | C9H12O2S2 | 69 | strong onion. |
| Thiophene-2-glyoxal-benzyl hemimercaptal | C13H12O2S2 | 78–9 | fried onion. |
| Thiophene-2-glyoxal-β-naphthyl hemimercaptal | C16H12O2S2 | 98–9 | beef broth. |
| Thiophene-2-glyoxal-thiophene-2-methyl hemimercaptal | C11H10O2S3 | 54–5 | coffee (in low concentration). |
| Thiophene-2-glyoxal-n-dodecyl hemimercaptal | C18H30O2S2 | 80–1 | mild; roasted meat. |
| Thiophene-2-glyoxal-phenyl hemimercaptal | C12H10O2S2 | 55–6 | cooked meat. |
| Thiophene-2-glyoxal-n-octadecyl hemimercaptal | C24H42O2S2 | 91 | slight. |
| p-Ethoxyphenylglyoxal-ethyl hemimercaptal | C12H16O3S | 87–9 | grassy. |
| p-Ethoxyphenylglyoxal-thiophene-2-methyl hemimercaptal | C15H16O3S2 | 37–8 | coffee (in low concentration). |
| p-Ethoxyphenylglyoxal-n-dodecyl hemimercaptal | C22H36O3S | 65–6 | mild. |
| p-Ethoxyphenylglyoxal-phenyl hemimercaptal | C16H16O3S | 57–8 | cooked meat. |
| p-Ethoxyphenylglyoxal-benzyl hemimercaptal | C17H18O3S | 64–5 | mild mercaptan. |
| Furyl-2-glyoxal-n-propyl hemimercaptal | C9H12O3S | 105–6 | onion. |
| Furyl-2-glyoxal-benzyl hemimercaptal | C13H12O3S | 103 | mild mercaptan. |
| Furyl-2-glyoxal-n-dodecyl hemimercaptal | C18H30O3S | 105–6 | mild. |
| Furyl-2-glyoxal-n-hexyl hemimercaptal | C12H18O3S | 94.5–5.5 | wheat. |

Note: All compounds are colorless crystals.

EXAMPLE II

*Furyl-2-glyoxal-n-propyl hemimercaptal*

Twelve and four-tenths grams (0.1 mole) of furyl-2-glyoxal was mixed thoroughly with 7.6 g. (0.1 mole) of n-propyl mercaptan. The mixture warmed spontaneously, and, on standing for forty minutes, deposited a mass of crystalline material. This could be recrystallized from heptane without further treatment to give a product weighing 19.6 g. (98% yield) and melting at 105–6° C. An analysis gave the following results: Calculated for $C_9H_{12}O_3S$: C—53.98%; H—6.04%. Found: C—53.93%; H—6.14%. The compound had an onion odor.

EXAMPLE III

*p - Ethoxyphenylglyoxal - thiophene - 2 - methyl hemimercaptal*

Seventeen and eight-tenths grams (0.1 mole) of p-ethoxyphenylglyoxal was mixed thoroughly with 13 g. (0.1 mole) of thiophene-2-methyl mercaptan. The mixture warmed spontaneously, and, on standing for about 30 minutes, deposited a crystalline mass. This could be recrystallized from n-hexane without further treatment to give 27.4 g. (89% yield) of crystals melting at 37–8° C. An analysis gave the following results: Calculated for $C_{15}H_{16}O_3S_2$: C—58.42%; H—5.23%; S—20.79%. Found: C—58.60%; H—5.50%; S—20.65%. The compound in low concentration had a coffee aroma.

EXAMPLE IV

*Phenylglyoxal-β-naphthyl hemimercaptal*

Thirteen and four-tenths grams (0.1 mole) of phenylglyoxal was mixed with 16 g. (0.1 mole) of β-naphthyl mercaptan. Heat was generated and the mixture crystallized after a short period. On recrystallization from heptane, 21.8 g. (74% yield) of product melting at 115–6° C. was obtained. An analysis gave the following results: Calculated for $C_{18}H_{14}O_2S$: C—73.44%; H—4.79%. Found: C—72.71%; H—4.88%. The compound had a pleasant aromatic odor.

From the above description it will be evident that we have discovered a new and useful group of hemimercaptals and a surprisingly simple and efficient reaction for producing them in high yield without the use of a condensing agent.

We claim:

1. Hemimercaptals having the formula:

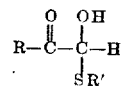

in which R and R' are radicals selected from the class consisting of alkyl, aryl, aralkyl, alkaryl, alkoxyaryl, furyl, thienyl, alkyl furyl and alkyl thienyl radicals, said hemimercaptals being solid, substantially colorless chemical individuals of well defined crystal habit.

2. Thiophene - 2-glyoxal - n - propyl hemimercaptal.

3. Phenylglyoxal-β-naphthyl hemimercaptal.

4. p - Ethoxyphenylglyoxal - thiophene - 2-methyl hemimercaptal.

5. Thiophene - 2 - glyoxal - thiophene - 2-methyl hemimercaptal.

6. Thiophene - 2 - glyoxal - phenyl hemimercaptal.

7. The method of forming hemimercaptals which comprises: mixing in substantially equimolecular amounts under non-aqueous conditions and in the absence of added condensing agent a glyoxal having the formula:

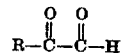

and a mercaptan having the formula:

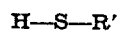

in which R and R' are selected from the class consisting of alkyl, aryl, aralkyl, alkaryl, alkoxyaryl, furyl, thienyl, alkyl furyl and alkyl thienyl radicals, permitting the temperature to rise to a maximum and fall to room temperature, whereby a crystalline mass is formed containing the desired hemimercaptal, and recovering said hemimercaptal from the crystalline mass.

8. The method as defined in claim 7, in which the hemimercaptal is recovered in purified form by recrystallization from a hydrocarbon fraction.

FRANK KIPNIS.
JOHN ORNFELT.

REFERENCES CITED

The following references are of record in the file of this patent:

UNITED STATES PATENTS

| Number | Name | Date |
| --- | --- | --- |
| 2,305,620 | Kremers | Dec. 22, 1942 |
| 2,327,966 | Morey | Aug. 24, 1943 |

OTHER REFERENCES

Chemical Abstracts 31, 3071 (7) (1937).
Chemical Abstracts 36, 4396 (6) (1942).